US006257610B1

(12) United States Patent
Plant

(10) Patent No.: US 6,257,610 B1
(45) Date of Patent: Jul. 10, 2001

(54) FOOT-OPERATED PROPULSION APPARATUS FOR WHEELCHAIRS AND OTHER SELECTED DEVICES

(76) Inventor: David F. Plant, 77 S. Washington St., Seattle, WA (US) 98104

( * ) Notice: Subject to any disclaimer, the term of this patent is extended or adjusted under 35 U.S.C. 154(b) by 0 days.

(21) Appl. No.: 09/505,603

(22) Filed: Feb. 16, 2000

(51) Int. Cl.[7] .................................................. B32M 1/00

(52) U.S. Cl. .................... 280/304.1; 280/210; 280/219; 280/250.1; 180/315

(58) Field of Search ...................... 180/315; 280/304.1, 280/220, 233, 210, 211, 200, 218, 219, 250.1

(56) References Cited

U.S. PATENT DOCUMENTS

| | | | | |
|---|---|---|---|---|
| 2,495,968 | * | 1/1950 | Hausman | 280/233 |
| 3,282,605 | * | 11/1966 | Nihlean et al. | 280/211 |
| 3,306,626 | * | 2/1967 | Kawada | 280/205 |
| 3,512,798 | * | 5/1970 | Siegel | 280/87.042 |
| 3,604,726 | * | 9/1971 | Tracy | 280/205 |
| 4,073,504 | * | 2/1978 | Knapp | 280/220 |
| 4,126,326 | * | 11/1978 | Phillips | 280/205 |
| 4,523,769 | * | 6/1985 | Glaser et al. | 280/252 |
| 4,822,068 | * | 4/1989 | Tyler | 280/211 |
| 4,892,323 | * | 1/1990 | Oxford | 280/250.1 |
| 5,241,876 | * | 9/1993 | Mathis | 74/481 |
| 5,273,304 | * | 12/1993 | Berkheimer | 280/304.1 |

* cited by examiner

*Primary Examiner*—Brian L. Johnson
*Assistant Examiner*—Deanna Draper
(74) *Attorney, Agent, or Firm*—Perkins Coie LLP

(57) ABSTRACT

A foot-operated propulsion apparatus for a wheelchair and/or other selected devices such as desk chairs and furniture. In one embodiment, the apparatus includes a support structure coupled to the selected device and having at least one roller aperture. A roller element having a circular cross-sectional shape is received in the roller aperture and is rotatable relative to the support structure about a rotation axis or a plurality of rotation axes. The roller element has a first external portion projecting upwardly from the aperture to engage the user's foot and a second external surface portion projecting downwardly through the aperture to engage the ground or other support surface. As the user engages the roller element and rotates the element by foot, the propulsion apparatus and the device to which it is coupled move along the ground. The user can directly engage the roller element or can engage a brake device coupled to the roller element to slow the propulsion device.

20 Claims, 4 Drawing Sheets

FOOT-OPERATED PROPULSION APPARATUS FOR WHEELCHAIRS AND OTHER SELECTED DEVICES

TECHNICAL FIELD

This invention relates to foot-operated propulsion devices for moving items such as wheelchairs, desk chairs and furniture.

BACKGROUND OF THE INVENTION

Wheelchairs typically include a frame, three or four wheels rotatably mounted to the frame, and a seat in which the user sits. The wheelchair can be propelled by one or more of several methods. For example, the wheelchair frame can include handles projecting rearwardly behind the seat. The handles are accessible to an operator who can push or pull the wheelchair from behind. One drawback with this arrangement is that the user is dependent upon the operator for propulsion and may not be able to easily move about when the operator is not present.

One approach to addressing this problem is to provide the wheelchair with an on-board propulsion device, such as an electric motor. However, the motor can significantly increase the cost and weight of the wheelchair. Another approach is to provide the rear wheels of the wheelchair with inwardly or outwardly extending rims that users can engage with their hands to roll the wheelchair along. This approach may not be efficient because it relies on the user's hands and arms, which may not be as strong as the user's legs or may be otherwise engaged. Accordingly, many users who still have some use of their legs propel themselves by kicking the ground in front of them to push the wheelchair backwards. This approach also suffers from several drawbacks. For example, the wheelchair users face opposite their direction of travel and cannot easily see where they are going. Some users may attempt to address this drawback by digging their heels into the ground ahead of them and pulling themselves and the wheelchair forward. However, this method is difficult to perform and is not very efficient due to the structure of the leg.

SUMMARY OF THE INVENTION

The present invention is directed toward foot-operated propulsion apparatuses for use with wheelchairs, office chairs, furniture or other selected devices. In one aspect of the invention, the apparatus can include a support structure having a coupling portion for coupling to the selected device. The support structure can further include at least one roller aperture that receives a roller element, at least a portion of which has a circular cross-sectional shape. The roller element is rotatable relative to the support structure about rotation axis and has a first external surface portion projecting upwardly through the roller aperture and shaped to releasably engage a user's foot. The first external surface portion is rotatable relative to the support structure at a first angular rotation rate. The roller element further includes a second external surface portion projecting downwardly through the roller aperture to engage a support surface. The second external surface portion is rotatable with the first external surface portion at a second angular rotation rate equal to the first angular rotation rate to roll along the support surface and propel the support structure in a selected direction as the user's foot rotates the first external surface portion.

In one aspect of the invention, the roller element can have a generally cylindrical shape and can be rotatable about a single axis relative to the support structure. Alternatively, the roller element can have a generally spherical shape and can be rotatable about a plurality of co-planar axes relative to the support structure. In a further aspect of the invention, two or more spherical roller elements can be coupled to the frame of a wheelchair for propelling the wheelchair in a selected direction. The external surface of each roller element can include raised traction elements for engaging the support surface and/or recessed cavities for engaging the user's feet. In still a further aspect of the invention, the roller element and support structure can be coupled to an office chair or can be releasably coupled to a piece of furniture.

DETAILED DESCRIPTION

The present disclosure describes foot-operated propulsion devices for moving wheelchairs, office chairs, furniture and other selected devices. Many specific details of certain embodiments of the invention are set forth in the following description and in FIGS. 1–9 to provide a thorough understanding of these embodiments. One skilled in the art, however, will understand that the present invention may have additional embodiments, or that the invention may be practiced without several of the details described below.

Figure 1:
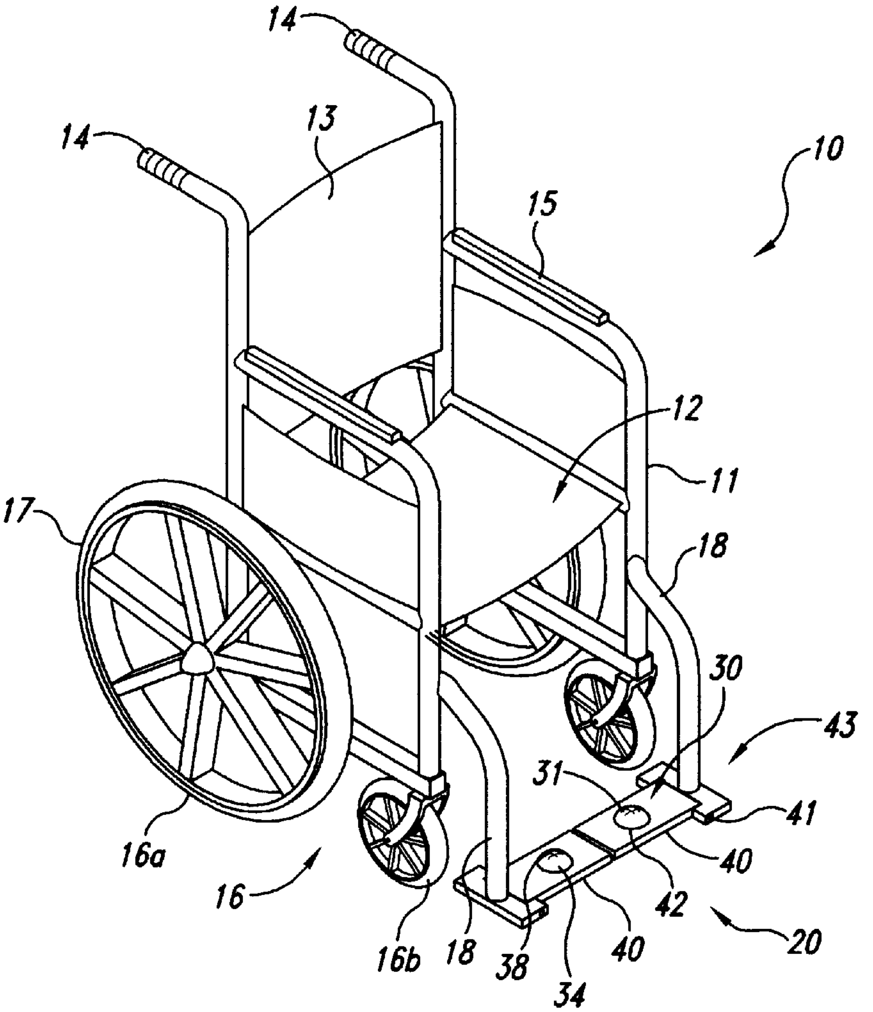
FIG. 1 is a partially schematic, isometric view of a wheelchair having a propulsion device in accordance with an embodiment of the invention.

FIG. 1 is a partially schematic isometric view of a wheelchair 10 having a propulsion device 20 in accordance with an embodiment of the invention. In one aspect of this embodiment, the wheelchair 10 includes a frame 11 that supports a seat 12 and a seatback 13 which together support a user (not shown) in a seated position. The frame 11 can further include armrests 15 to support the user's arms when the user is seated in the seat 12. The frame 11 is supported relative to the ground or other support surface by a plurality of wheels 16, for example, four wheels 16, including two large rear wheels **16*a* and two smaller front wheels 16*b*. The rear wheels 16*a* can include an external rim 17 for propelling the wheelchair 10 by hand in the manner described above. The frame 11 can include rearwardly projecting handles 14** for operator-assisted propulsion, also in the manner described above.

The frame 11 can further include extension members 18 that project forwardly and downwardly to support the propulsion device 20. In one embodiment, the propulsion device 20 includes two support members 40, each having an aperture 42. A roller element 30, such as a sphere 31, is rotatably mounted in each aperture 42. Each roller element 30 has an external surface 34 that projects upwardly from the aperture 42 to engage the user's foot and projects downwardly from the aperture 42 to engage the ground. Accordingly, users can engage the external surfaces 34 of the roller elements 30 with their feet and move their feet forward in a kicking motion to rotate the roller elements 30 along the ground. As the roller elements 30 rotate forward, they draw the wheelchair 10 and the user forward.

The propulsion device 20 can also be operated to move the wheelchair 10 in other directions. For example, users can rotate the roller elements 30 rearwardly by engaging their feet with the roller elements 30 and drawing their feet backwards to roll the roller elements 30 and the wheelchair 10 backwards. The users can also roll one or both of the roller elements 30 sideways to turn or pivot the wheelchair 10. Accordingly, when the roller elements 30 include the spheres 31, each roller element 30 is rotatable about a plurality of co-planar axes relative to the support member 40 in which it is positioned.

In one embodiment, the roller elements 30 can have a diameter of from about 2.0 inches to about 3.0 inches. Alternatively, the roller elements 30 can have larger or smaller diameters in other embodiments. An advantage of roller elements having a larger diameter is that they increase the distance the wheelchair travels with each stroke of the user's feet. Conversely, an advantage of roller elements having a smaller diameter is that they can integrate more easily with the wheelchair structure. In either embodiment, the portion of the roller element 30 engaging the ground rotates at the same angular rate as the portion engaging the user's feet.

The external surfaces 34 of each roller element 30 can have traction elements 38 that increase the traction between the roller elements 30 and the ground. The traction elements 38 can also increase the friction between the roller elements 30 and the user's feet to reduce slippage therebetween and increase the efficiency of the user's foot motion. For example, in one embodiment the traction elements 38 can include fibrous materials generally similar to the fibrous external surface of a tennis ball. Alternatively, the traction elements 38 can include a tacky or adhesive material. In other embodiments, the traction element 38 can include other devices, such as studs, protrusions, ribs, or recesses.

In one embodiment, the support members 40 can be pivotably coupled to the extension members 18 with hinge pins 41 or other pivotable devices. Accordingly, the support members 40 can be rotated between a horizontal, engaged position during operation (as shown in FIG. 1) and a vertical, disengaged position with the support members 40 pivoted outwardly away from the user's feet when the propulsion device 20 is not in use (described below with reference to FIG. 2). In a further aspect of this embodiment, the support members 40 can be releasably locked with a locking device 43 in the engaged position and/or the disengaged position to restrict inadvertent movement between the positions. In still a further aspect of this embodiment, the support members 40 can be biased downwardly in the engaged position so the roller elements 30 press against the ground for increased traction.

Figure 2:
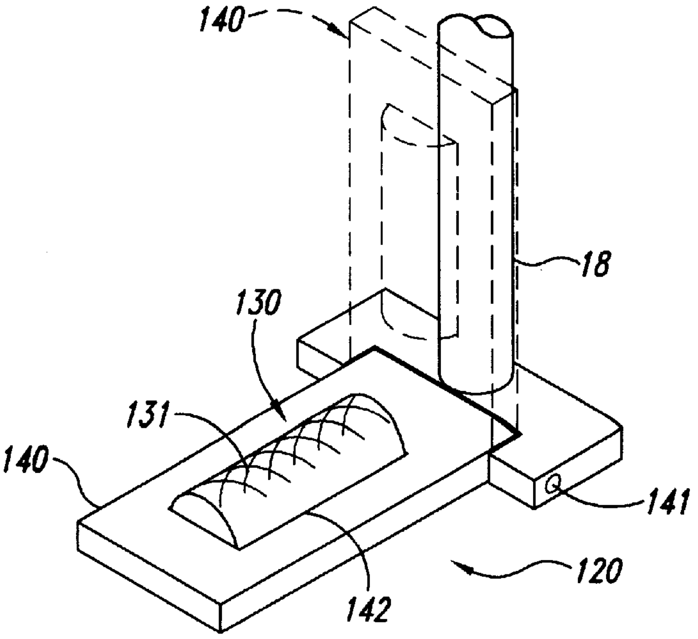
FIG. 2 is a top isometric view of a propulsion device in accordance with an alternate embodiment of the invention.

FIG. 2 is an isometric view of a propulsion device 120 that includes a roller element 130 in accordance with another embodiment of the invention. The roller element 130 can include a cylinder 131 rotatably mounted in an elongated aperture 142 of a support member 140. In one aspect of this embodiment, the roller element 130 can be mounted to the support member 140 with its axis of rotation transverse to the forward motion direction of the wheelchair 10 (FIG. 1) for rolling the wheelchair 10 forward and backward. Alternatively, the roller element 130 can be mounted transverse to the forward motion direction for rolling the wheelchair 10 laterally. In either embodiment, the support member 140 can be pivotally mounted to the extension member 18 of the wheelchair 10 with a pivot pin 141 generally as described above with reference to FIG. 1. Accordingly, the support member 140 can pivot between the engaged position (shown in solid lines in FIG. 2) and the disengaged position (shown in phantom lines in FIG. 2). In the disengaged position, the support member 140 is positioned to the side of the user's feet so the user can directly access the ground, for example to get in and out of the wheelchair 10. In other embodiments, the propulsion device 120 can include other arrangements for stowing the support members 140. For example, the extension members 18 can movably coupled to the frame 11 (FIG. 1) to move the support member 140 between the engaged and disengaged positions. In another aspect of this embodiment, the flat support member 140 can be replaced with a spindle-shaped support member, such as a rod, that extends transversely inwardly from the extension member 18 to rotatably support the roller element 130.

Figure 3:
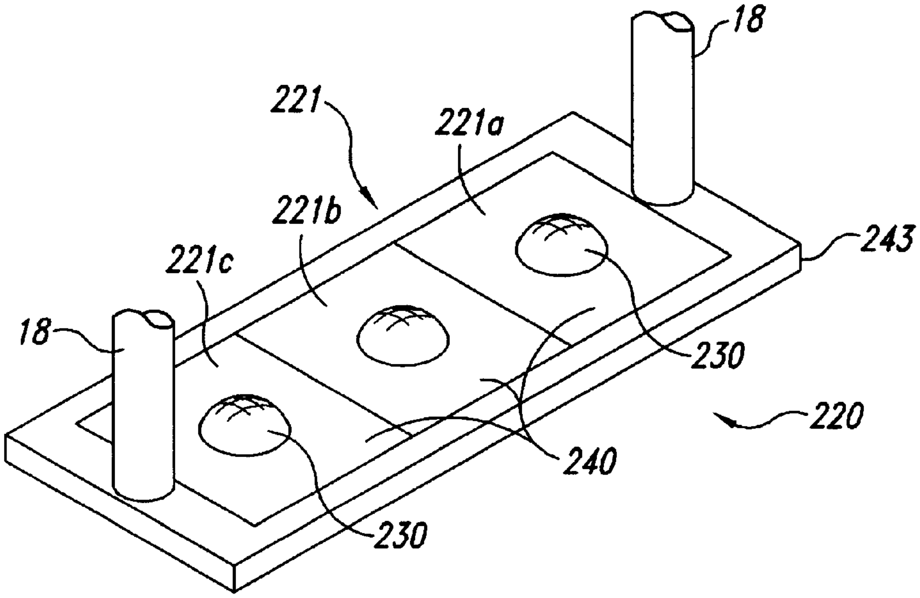
FIG. 3 is a top isometric view of a propulsion device having a plurality of propulsion elements in accordance with another alternate embodiment of the invention.

FIG. 3 is an isometric view of a propulsion device 220 having three removable propulsion elements 221, shown as a left propulsion element 221*a*, center propulsion element 221*b* and right propulsion element 221*c*. Each propulsion element 221 includes a support member 240 that rotatably supports a roller element 230. The roller element 230 can include a sphere (shown in FIG. 3), or alternatively, the roller element 230 can include a cylinder, generally similar to the cylinder 131 described above with reference to FIG. 2.

In either of the embodiments described above with reference to FIG. 3, the propulsion elements 221 can be removably positioned in a support frame 243 that is connected to the extension members 18 of the wheelchair 10 (FIG. 1). Accordingly, users can selectively install one or more of the propulsion elements 221 in the support frame 243. For example, when a user has use of his left foot but not his right foot, he can install the left propulsion element 221*a* and replace the right propulsion element 221*a* and/or the center propulsion element 221*b* with a blank plate (not shown). An advantage of this arrangement is that users can tailor the configuration of the propulsion device 220 to their particular needs.

Figure 4:
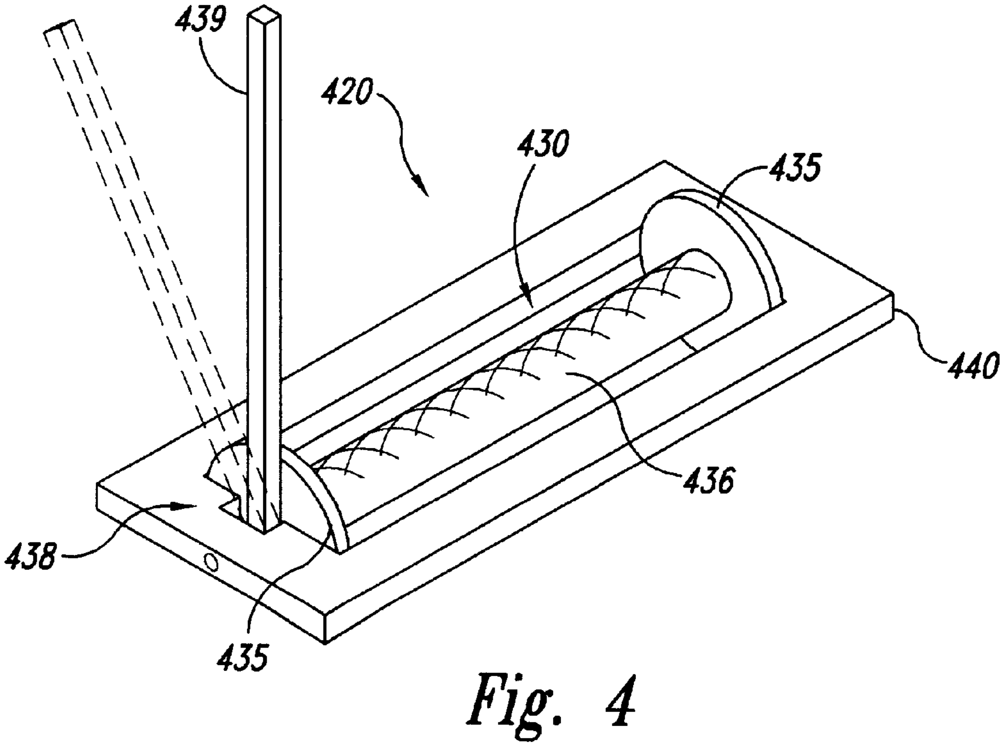
FIG. 4 is an isometric view of a propulsion device that includes a cylinder with multiple diameters in accordance with another embodiment of the invention.

FIG. 4 is an isometric view of a propulsion device 420 that includes a roller element 430 having portions with different diameters. In one aspect of this embodiment, the roller element 430 includes a cylinder rotatably supported by a support member 440. The cylinder includes a central driver portion 436 and two wheel portions 435 disposed outwardly from the driver portion 436. In one aspect of this embodiment, the wheel portions 435 have a larger diameter than the driver portion 436 to engage the ground beneath the propulsion device 420. An advantage of the larger wheel portions 435 is that they can more easily roll over obstacles. An advantage of the reduced diameter driver portion 436 is that it does not contact the ground and accordingly is less likely to accumulate debris. Alternatively, an advantage of having a larger diameter portion of the roller element contact the user's foot (as shown in FIG. 2) is that the propulsion element will travel a greater distance with each stroke of the user's foot.

In one embodiment, the propulsion device 420 can include a brake device 438 such as a lever 439 operatively coupled to the roller element 430 to slow and/or halt the rotation of the roller element 430. In one aspect of this embodiment, the brake lever 439 can be moveable between a disengaged position, shown in solid lines in FIG. 4, and an engaged position, shown in phantom lines. In other embodiments, the brake device 438 can include other brake elements. Alternatively, users can apply their feet directly to the roller element 430 to slow and/or halt the roller element 430 and the wheelchair 10 is (FIG. 1) or other device to which the roller element 430 is coupled, in addition to or in lieu of the brake device 438. The brake device 438 can be included in any of the propulsion devices described above with reference to FIGS. 1–3 and/or below with reference to FIGS. 5–8.

Figure 5:
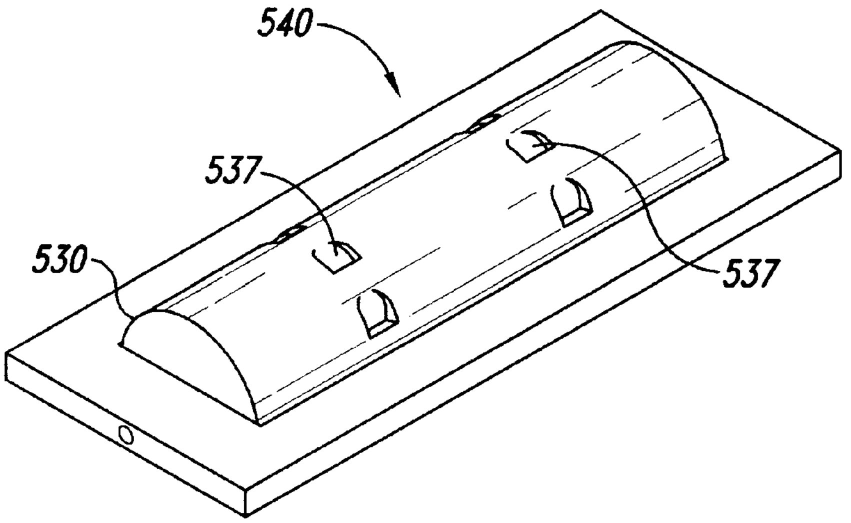
FIG. 5 is an isometric view of a propulsion device having heel recesses in accordance with yet another embodiment of the invention.

FIG. 5 is an isometric view of a propulsion device 540 that includes a cylindrical roller element 530 having heel recesses 537 in accordance with another embodiment of the invention. In one aspect of this embodiment, the roller element 530 can span approximately the entire width of the wheelchair 10 (FIG. 1) and can include two or more sets of heel recesses 537, one aligned with the user's left foot and the other aligned with the user's right foot. Alternatively, the propulsion device 540 can include two separate roller elements 530, each having one or more sets of heel recesses 537 aligned with one of the user's feet. In still another aspect of this embodiment, the roller element 530 can include one or more spheres (generally similar to those discussed above with reference to FIGS. 1 and 3), each having a plurality of heel recesses in the external surfaces thereof. In any of the foregoing embodiments discussed above with reference to FIG. 5, the users engage the heel recesses 537 with their heels when rotating the roller element 530 in a forward direction. An advantage of the heel recesses 537 is that they can reduce the tendency for the users' heels to slip when engaging the roller element 530 if, for example, the user is wearing socks or other low-traction foot coverings.

Figure 6:
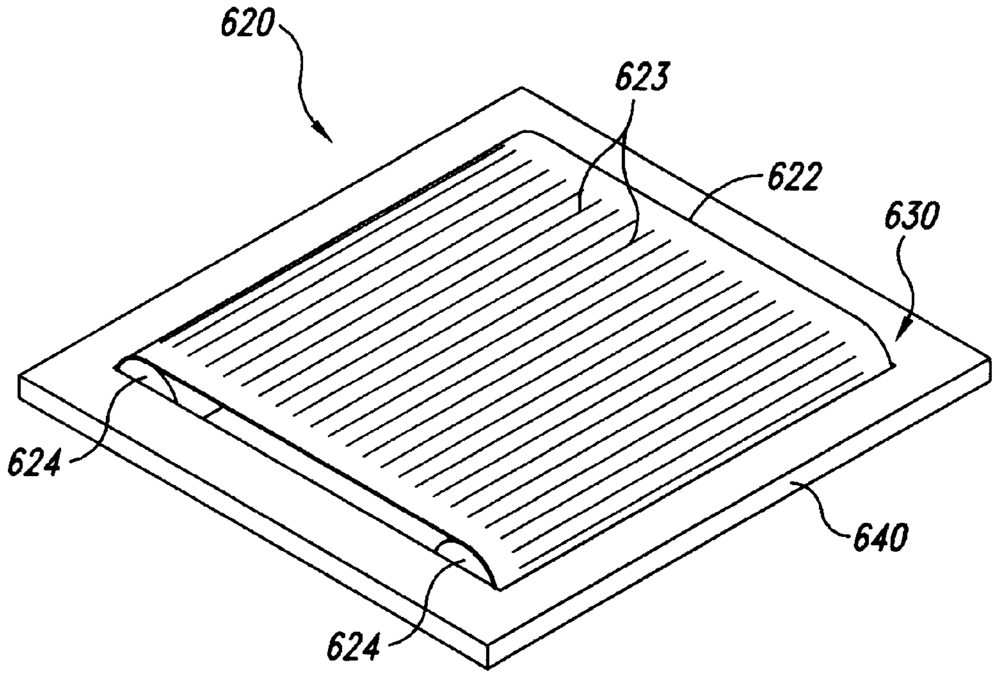
FIG. 6 is an isometric view of a propulsion device having a rotating tread accordance with still another embodiment of the invention.

FIG. 6 is an isometric view of a propulsion device 620 having a roller element 630 that includes a rotating tread 622. In one aspect of this embodiment, the propulsion device 620 can include a support member 640 and two or more tread support wheels 624 rotatably mounted to the support member 640. In a further aspect of this embodiment, a single trend 622 can span the width of the support member 640; alternatively, the tread 622 can include separate left and right tread portions that are rotatable independent of each other. In either of these embodiments, the tread 622 is wrapped around the tread support wheels 624 in a conventional manner so that an upwardly facing surface of the tread 622 is accessible to the user's feet and a downwardly facing surface of the tread 622 contacts the ground. The tread 622 can include traction elements 623, such as transverse ribs, that increase the traction between the tread 622 and both the ground and the users' feet. Accordingly, the users can move the propulsion device 620 (and the selected device to which it is attached, for example the wheelchair 10 described above with reference to FIG. 1) forward or backward by engaging the upwardly facing surface of the tread 622 with their feet and moving their feet forward or backward, respectively.

Figure 7:
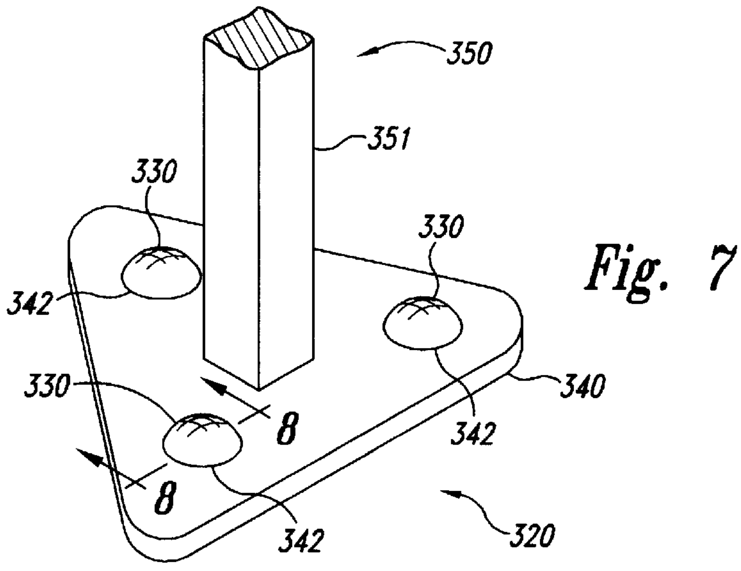
FIG. 7 is a top isometric view of a propulsion device releasably coupled to a piece of furniture in accordance with yet another embodiment of the invention.

FIG. 7 is an isometric view of a propulsion device 320 releasably coupled to a piece of furniture 350 or other heavy item in accordance with another embodiment of the invention. In one aspect of this embodiment, the propulsion device 320 can include a support member 340 having a plurality of apertures 342, each rotatably supporting a roller element 330. In one embodiment, the roller element 330 can include a sphere or alternatively, the roller element 330 can include a cylinder. In either embodiment, the propulsion device 320 can include enough roller elements 330 to elevate the support member 340 and the furniture 350 of the ground. Accordingly, the roller elements 330 project upwardly from the apertures 342 to engage a user's foot and project downwardly through the apertures 342 to engage the ground. In operation, users can engage the upwardly projecting surfaces of the roller elements 330 with their feet to roll the propulsion device 320 and the piece of furniture 350 along the ground. In one aspect of this embodiment, the support member 340 can include a flat surface for supporting a leg 351 of the furniture 350. Alternatively, the support member 340 can include other surfaces or features (such as a recess) to releasably support the leg 351. In either embodiment, an advantage of the propulsion device 320 is that it can be used to accurately position furniture or other heavy items.

Figure 8:
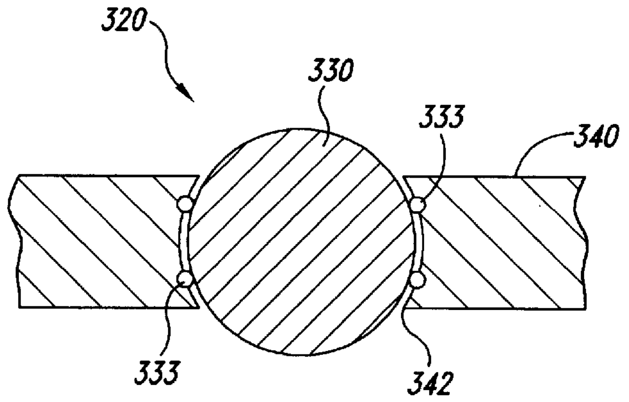
FIG. 8 is a cross-sectional view of a portion of the device shown in FIG. 7 taken substantially along line 8—8.

FIG. 8 is a cross-sectional view of a portion of the propulsion device 320 described above with reference to FIG. 7. As shown in FIG. 8, the propulsion device 320 can include a plurality of ball bearings 333 positioned between the roller element 330 and the walls of the aperture 342 in which the roller element 330 is positioned. Accordingly, the roller element 330 can more easily rotate relative to the support member 340. Similar ball bearing arrangements can be used to support the roller elements discussed above with reference to FIGS. 1–7 and below with reference to FIG. 9.

Figure 9:
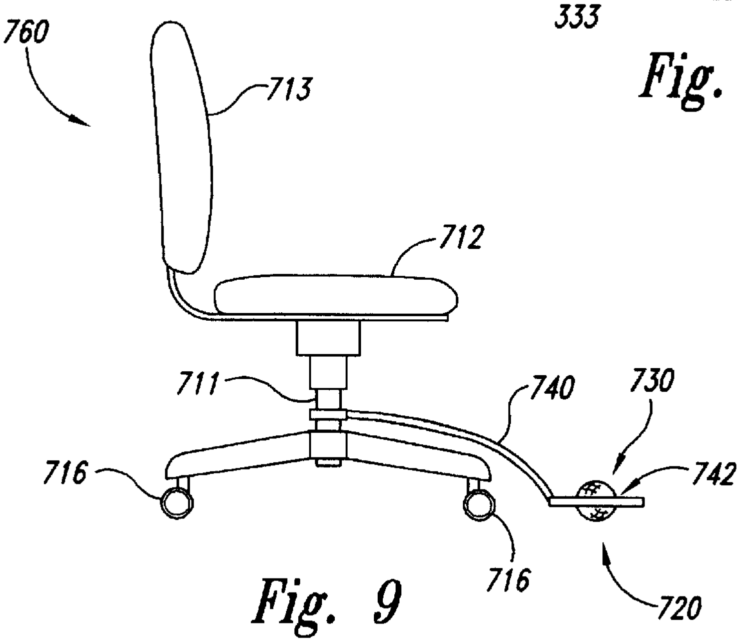
FIG. 9 is a side elevation view of a propulsion device attached to an office chair in accordance with still another embodiment of the invention.

FIG. 9 is a side elevation view of a propulsion device 720 attached to an office chair 760 in accordance with still another embodiment of the invention. In one aspect of this embodiment, the chair 760 can include a frame 711 that supports a seat 712 and a seatback 713 in a conventional manner. Wheels 716 are attached to the bottom of the frame to allow the chair 760 to roll about. The propulsion device 720 includes a support member 740 attached to the frame 711 and extending outwardly from a central stem of the chair 760. The support member 740 can include an aperture 742 that rotatably supports a roller element 730 in a manner generally similar to that discussed above with reference to FIGS. 1–8. In one aspect of this embodiment, the roller element 730 can include a sphere, or alternatively, the roller element 730 can include a cylinder or rotating tread. In any of these embodiments, the user engages the upwardly projecting surface of the roller element 730 while seated in the seat 12 to move the propulsion device 720 and the chair 760 forward, backward, and/or laterally in a manner generally similar to that discussed above.

From the foregoing, it will be appreciated that, although specific embodiments of the invention have been described herein for purposes of illustration, various modifications may be made without deviating from the spirit and scope of the invention. For example, many of the features discussed separately above with reference to particular embodiments can be combined in other embodiments. Accordingly, the invention is not limited except as by the appended claims.

What is claimed is:

1. A wheelchair, comprising:

a frame;

a seat attached to the frame;

a plurality of support wheels rotatably mounted to the frame; and at least one of a first and second rotary propulsion device rotatably coupled to the frame and manually rotatable relative to the frame, the first rotary propulsion device including a roller element positioned beneath the seat and having a circular cross-sectional shape with a first external surface portion accessible from above and shaped to releasably engage a user's foot and a second external surface portion projecting downwardly and configured to engage a support surface, the first and second external surface portions being rotatable with each other at the same angular rotation rate, the second external surface portion configured to roll along the support surface and propel the frame and support wheels in a selected direction as the user's foot rotates the first external surface portion, the second rotary propulsion device having first and second tread support wheels rotatably coupled to the frame and a tread element positioned beneath the seat and extending around the first and second tread support wheels, the tread element having an internal surface portion engaged with the first and second tread wheels and an external surface portion configured to engage the user's foot and engage the support surface, the external surface portion rolling along the support surface and propelling the frame and the support wheels in the selected direction as the user's foot moves the tread around the tread rollers.

2. The wheelchair of claim 1 wherein the external surface portion of the tread element includes a plurality of traction features projecting above, below, or both above and below the external surface portion and configured to engage the user's foot and the support surface.

3. The wheelchair of claim 1 wherein the roller element has a generally spherical shape and is rotatable relative to the frame about a plurality of co-planar axes.

4. The wheelchair of claim 1 wherein the roller element has a generally cylindrical shape and is rotatable relative to the frame about a single axis.

5. The wheelchair of claim 1 wherein the first external surface portion has a first radius and the second external surface portion has a second radius different than the first radius.

6. The wheelchair of claim 1 wherein at least one of the first and second external surface portions includes raised traction elements for engaging the support surface.

7. The wheelchair of claim 1 wherein at least one of the first and second external surface portions includes recessed cavities for engaging the user's foot.

8. A foot-operated propulsion apparatus, comprising:

a support structure having a coupling portion for coupling to a selected device, the support structure further having at least one roller aperture; and a roller element, at least a portion of which has a circular cross-sectional shape, the roller element being received in the roller aperture of the support structure and rotatable relative to the support structure about a rotation axis, the roller element having a first external surface portion projecting upwardly through the roller aperture and shaped to releasably engage a user's foot, the first external surface portion being rotatable relative to the support structure at a first angular rotation rate about the rotation axis, the roller element further having a second external surface portion projecting downwardly through the roller aperture to engage a support surface, the second external surface portion being rotatable with the first external surface portion at a second angular rotation rate equal to the first angular rotation rate to roll along the support surface and propel the support structure in a selected direction as the user's foot rotates the first external surface portion.

9. The apparatus of claim 8, further comprising the selected device, the selected device including a wheelchair having a frame, a seat attached to the frame and a plurality of support wheels rotatably coupled to the frame, the coupling portion of the support structure being coupled to the frame with the roller element positioned beneath the seat and accessible to the user's foot.

10. The apparatus of claim 8 wherein the coupling portion of the support structure includes a generally flat surface configured to removably engage a leg of a piece of furniture, further wherein the roller aperture is a first roller aperture and the roller element is a first roller element, the support structure having a second roller aperture and a third roller aperture, further comprising second and third roller elements, the second roller element rotatably received in the second roller aperture, the third roller element rotatably received in the third roller aperture, each of the second and third roller elements having a first external surface portion projecting upwardly from the support structure and shaped to releasably engage a user's foot, each of the second and third roller elements further having a second external surface portion projecting downwardly from the support structure to engage the support surface.

11. The apparatus of claim 8, further comprising the selected device, the selected device including a desk chair having a frame, a seat attached to the frame and a plurality of support wheels rotatably coupled to the frame, the coupling portion of the support structure being coupled to the frame with the roller element positioned forward of and beneath the seat and accessible to the user's foot from above when the user is seated in the seat.

12. The apparatus of claim 8 wherein the roller element has a generally cylindrical shape and is rotatable about a single axis relative to the support structure.

13. The apparatus of claim 8 wherein the roller element has a generally spherical shape and is rotatable about a plurality of co-planar axes relative to the support structure.

14. The apparatus of claim 8, further comprising ball bearings rotatably positioned between the roller element and the support structure.

15. A wheelchair, comprising:

a frame;

a seat attached to the frame a plurality of support wheels rotatably coupled to the frame;

a first foot-powered propulsion device coupled to the frame, the first foot-powered propulsion device including a support member and a spherical propulsion element rotatably coupled to the support member and rotatable relative to the support member, the support member being movably coupled to the frame and moveable relative to the frame between a disengaged position and an engaged position, the spherical propulsion element being rotatable relative to the support member and the frame about a plurality of co-planar axes, the spherical propulsion element having a textured external surface including a first portion projecting downwardly from the support member and engaged with the ground when the support member is in the engaged position and disengaged from the ground when the support member is in the disengaged position, the external surface having a second portion projecting upwardly from the support member to engage a user's foot when the support member is in the engaged position; and a second foot-powered propulsion device coupled to the frame, the second foot-powered propulsion device including a second support member and a second spherical propulsion element rotatably coupled to the second support member and rotatable relative to the second support member, the second support member being movably coupled to the frame and moveable relative to the frame between a disengaged position and an engaged position, the second spherical propulsion element being rotatable relative to the frame and the support member about a plurality co-planar of axes, the second spherical propulsion element the spherical propulsion element having a textured external surface including a first portion projecting downwardly from the support member and engaged with the ground when the support member is in the engaged position and disengaged from the ground when the support member is in the disengaged position, the external surface having a second portion projecting upwardly from the support member to engage a user's foot when the support member is in the engaged position.

16. The wheelchair of claim 15 wherein the first foot-powered propulsion device is positioned toward a left side of the frame for alignment with the user's left foot and the second foot-powered propulsion device is positioned toward a right side of the frame for alignment with the user's right foot, further comprising a third foot-powered propulsion device positioned between the first and second foot-powered propulsion devices, the third foot-powered propulsion device having a third spherical propulsion element rotatable relative to the frame about a plurality co-planar of axes.

17. The wheelchair of claim 15, further comprising a locking device operatively coupled to the first foot-powered propulsion device and the frame and configured to releasably secure the first foot-powered propulsion device in the engaged position, the disengaged position, or both the engaged and the disengaged positions.

18. The wheelchair of claim 15 wherein the first foot-powered propulsion device is pivotably coupled to the frame about a first pivot axis aligned with a left side of the frame and the second foot-powered propulsion device is pivotably coupled to the frame about a second pivot axis aligned with a right side of the frame, the first and second foot-powered propulsion devices pivoting toward each other from an upright position to a transverse position when moving between their disengaged positions and their engaged positions.

19. The wheelchair of claim 15 wherein the first and second foot-powered propulsion devices are removably coupled to the frame.

20. The wheelchair of claim 15, further comprising a brake device operatively coupled to the foot-powered propulsion device to slow, halt, or both slow and halt movement of the propulsion device.

* * * * *

UNITED STATES PATENT AND TRADEMARK OFFICE

CERTIFICATE OF CORRECTION

PATENT NO. : 6,257,610 B1 Page 1 of 1
DATED : July 10, 2001
INVENTOR(S) : David F. Plant It is certified that error appears in the above-identified patent and that said Letters Patent is hereby corrected as shown below:

Title page,
Item [75], Inventors, delete "77 S. Washington St., Seattle, WA (US) 98104" and replace with -- 223 Yesler Way, Suite 524, Seattle, WA (US) 98104. --.

Signed and Sealed this

Twenty-third Day of August, 2005

JON W. DUDAS
*Director of the United States Patent and Trademark Office*